(12) United States Patent
Hein et al.

(10) Patent No.: US 6,441,776 B1
(45) Date of Patent: Aug. 27, 2002

(54) METHOD AND APPARATUS FOR SPACECRAFT PAYLOAD POINTING REGISTRATION

(75) Inventors: Douglas H. Hein, Los Angeles; Rongsheng Li, Hacienda Heights, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/479,701

(22) Filed: Jan. 7, 2000

(51) Int. Cl.$^7$ .............................. G01S 5/02; H04B 7/185
(52) U.S. Cl. ................... 342/357.06; 244/164; 244/171
(58) Field of Search ...................... 342/357.06; 244/164, 244/171

(56) References Cited

U.S. PATENT DOCUMENTS 6,068,217 A * 5/2000 Stoen et al. ................ 244/164
6,266,616 B1 * 7/2001 Needelman ................ 701/222

* cited by examiner

Primary Examiner—Theodore M. Blum
(74) Attorney, Agent, or Firm—Gates & Cooper LLP

(57) ABSTRACT

A method, apparatus, and article of manufacture for directing a payload coupled to a spacecraft substantially at a target location is disclosed. The method comprises the steps of determining spacecraft orbital parameters and spacecraft payload attitude parameters; and directing the payload at the target location by applying a spacecraft bus steering law determined at least in part from the orbit and attitude parameters. The apparatus comprises a navigation system for determining spacecraft orbit parameters and spacecraft attitude parameters, and for applying a spacecraft bus steering law to direct the payload substantially at the target location. The spacecraft bus steering law is determined at least in part from the determined spacecraft orbital parameters, the determined spacecraft attitude, and determined payload attitude parameters. In one embodiment, the apparatus includes a payload attitude control system for directing the payload relative to the spacecraft bus. The article of manufacture comprises a program storage device tangibly embodying a series of instruction for performing the above method steps.

44 Claims, 10 Drawing Sheets

METHOD AND APPARATUS FOR SPACECRAFT PAYLOAD POINTING REGISTRATION

CROSS-REFERENCE TO RELATED APPLICATIONS

This application is related to the following co-pending and commonly assigned patent application, which is hereby incorporated by reference herein: application Ser. No. 09/479,702, entitled "METHOD AND APPARATUS FOR SPACECRAFT ANTENNA BEAM POINTING CORRECTION," filed on Jan. 7, 2000, by Yeong-Wei Wu and Rongsheng Li,.

BACKGROUND OF THE INVENTION

1. Field of the Invention

The present invention relates to spacecraft and payload control systems, and in particular to a system and method for directing a spacecraft payload at a specified target location.

2. Description of the Related Art

Satellites, particularly those in geosynchronous or geostationary orbits, are an economical means for transmitting information over vast distances. These applications typically require that the sensitive axis of the payload (which can include a camera or communication antenna) be directed to point to a precise location on the surface of the Earth.

U.S. Pat. No. 4,688,091, issued on Aug. 18, 1987 to Kamel et al. discloses a system for directing a spacecraft payload to a precise location on the Earth's surface. While this system allows for precise payload pointing, it requires that the payload itself be steered. This technique is inapplicable to payloads that cannot be steered independently from the satellite body, and is an expensive and complex solution, even for payloads that allow for independent steering. Further, the system disclosed in this reference relies upon data sensed by the payload itself (i.e. a camera) for precise pointing. This solution is inapplicable to payloads that cannot provide such data, or do not have the throughput and bandwidth to provide such data at a latency and rate as required.

What is needed is a system and method for accurate payload steering that is effective with a wide variety of payloads, and which can be inexpensively implemented according to the pointing accuracy requirements for each specific payload. The present invention satisfies that need.

SUMMARY OF THE INVENTION

To address the requirements described above, the present invention discloses a method, apparatus, and article of manufacture for directing a payload coupled to a spacecraft substantially at a target location.

The method comprises the steps of determining spacecraft orbit parameters, spacecraft bus attitude parameters and spacecraft payload attitude parameters, and directing the payload at the target location by applying a spacecraft bus steering law determined at least in part from the orbit and bus/payload attitude parameters. The apparatus comprises a navigation system for determining spacecraft orbit parameters and spacecraft attitude parameters, and for applying a spacecraft bus steering law to direct the payload substantially at the target location. The spacecraft bus steering law is determined at least in part from the determined spacecraft orbital parameters, the determined spacecraft attitude, and determined payload attitude parameters. In one embodiment, the apparatus includes a payload attitude control system for directing the payload relative to the spacecraft bus. The article of manufacture comprises a program storage device tangibly embodying a series of instructions for performing the above method steps.

The foregoing invention uses "smart steering" to steer the spacecraft body (i.e. spacecraft bus) such that the pointing registration (alignment of the payload line-of-sight relative to the earth's surface) error of a directionally sensitive payload, such as a camera, due to payload thermal deformation and spacecraft attitude error can be compensated. The payload can be mechanically steerable, electronically steerable or unsteerable with respect to the spacecraft bus. The foregoing invention also allows the dynamic range of spacecraft payload pointing registration error due to spacecraft orbit error to be minimized. Further, the payload steering algorithm for compensating payload pointing registration error (if implemented) can be simplified.

These smart steering techniques can be used with tight orbit control. This allows precise payload pointing registration to be achieved without implementing the payload steering correction algorithm.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Figure 1:
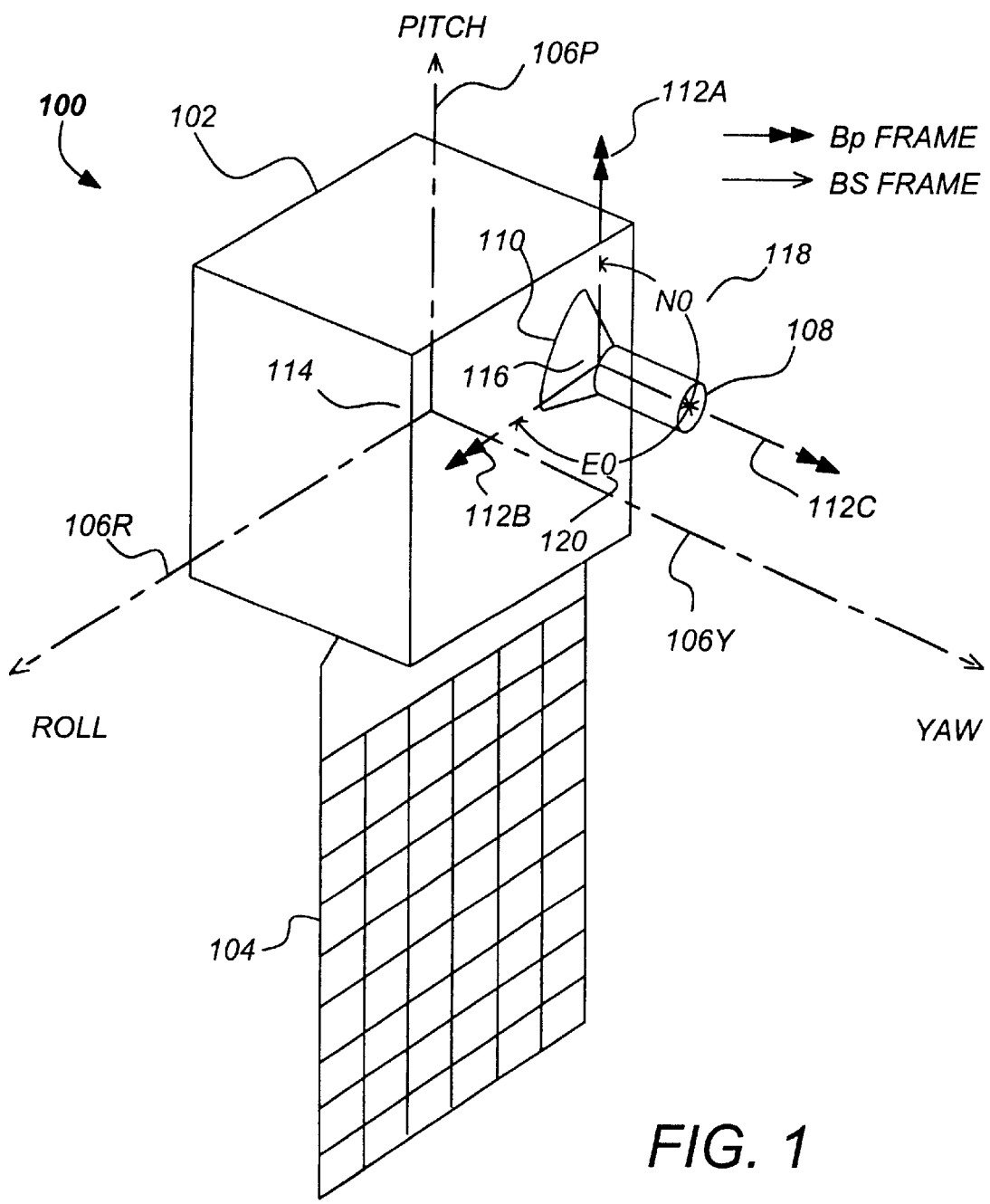
FIG. 1 is a diagram illustrating a spacecraft.

FIG. 1 is a diagram illustrating a spacecraft 100. The spacecraft 100 generally comprises one or more solar wings such as solar wing 104 having solar cells for generating power to operate spacecraft subsystems. The spacecraft 100 also includes a payload 108. Generally, the payload 108 is mounted to the spacecraft body 102. The spacecraft body is described in terms of a spacecraft body reference frame Bs 114 which can be represented, for example, by three substantially normal axes, such as pitch axis 106P, roll axis 106R, and yaw axis 106Y (collectively referred to as the spacecraft reference frame axes 106). The payload 108 may include a directionally sensitive payload such as a camera, an antenna, or similar device. The payload 108 can be directionally oriented by a payload orientation system 110. The payload orientation system 110 can be a mechanical device such as a gimbal 110, or may alternatively or in combination with the sensitive axis of the payload (typically along vector 112C) can be electrically oriented and controlled. The orientation of the payload 108 is described by a payload reference frame 116, which can be represented, for example, by three substantially normal axes, 112A–112C (collectively referred to hereinafter as the payload reference frame axes 112). A system may be implemented to measure the attitude of the payload 108, either with respect to the spacecraft body 102 (as can be implemented with position potentiometers) or with respect to an inertial reference.

Figure 2:
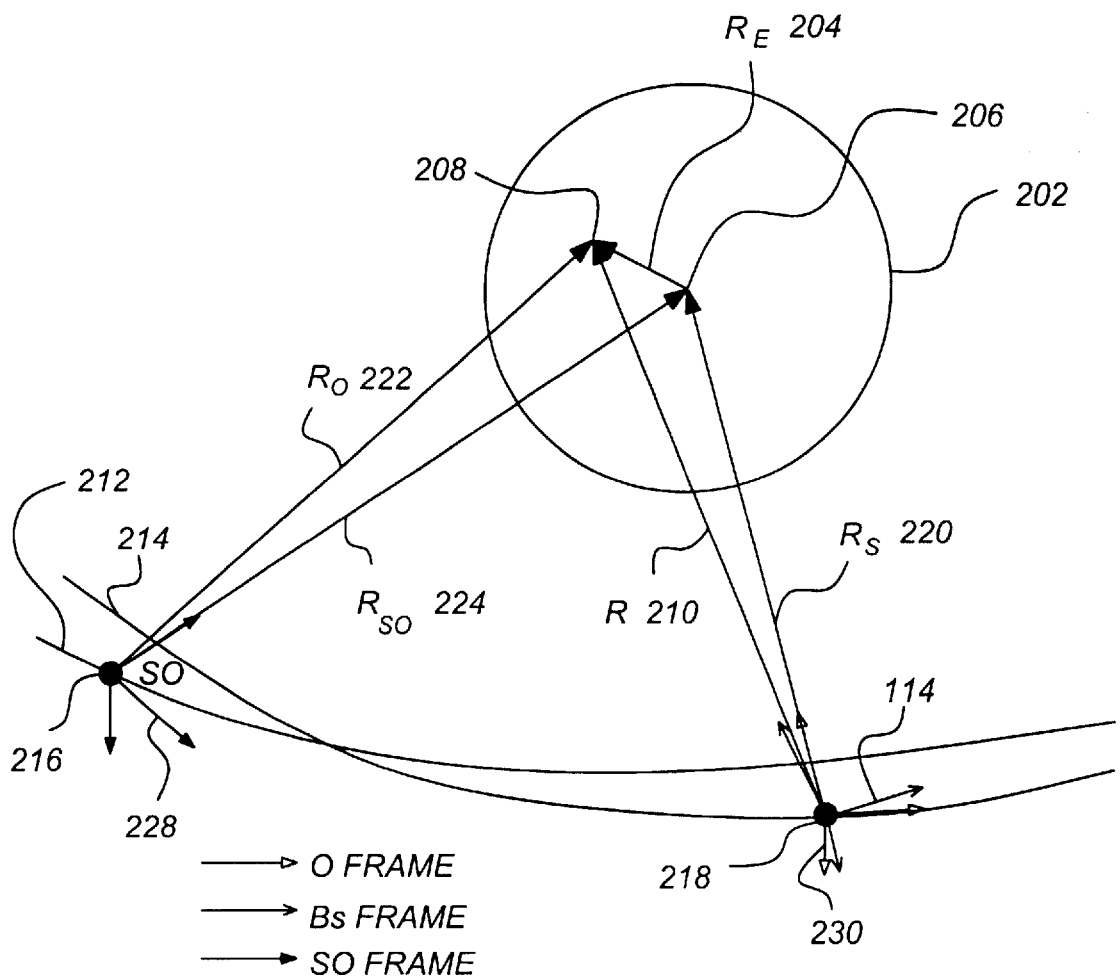
FIG. 2 is a diagram illustrating vectors and orientations relevant to orienting the payload of a spacecraft to the proper location on an object.

FIG. 2 is a diagram illustrating vectors and orientations relevant to orienting the payload of a spacecraft to the proper location on an object, such as the Earth 202. The location on the object can be defined by a vector $R_E$ 204 pointed from a reference point 206 (such as the center of the earth) to the target location 208. The target location 208 defines where the payload-target line of sight (LOS) vector 210, and hence, where the payload sensitive axis (e.g. axis 112C) should be directed.

At any moment in time, the spacecraft 100 is in an orbit that can be described by a set of orbital parameters. In one embodiment, these orbital parameters can include ephemeris data, or a set of vectors describing the instantaneous velocity and position of the spacecraft 100 at any particular instant in time, or equivalent representation. If the spacecraft position and spacecraft orbit were perfect, the spacecraft 100 would be located at a point 216 in the ideal orbit 212. However, this ideal orbit point 216 is normally not coincident with the spacecraft location 218 in its actual orbit 214 at the same time moment.

The distance vector from the actual spacecraft position 218 to the target location 208 is denoted by the vector R 210. Similarly, the distance vector from the actual spacecraft position 218 to the object reference point 206 (i.e. the center of the Earth) is denoted by vector $R_s$ 220. The distance vector from the ideal spacecraft position 216 to the target location 208 is denoted by $R_O$ 222. The distance vector from the ideal spacecraft position 218 to the object reference point (i.e. the center of Earth) is denoted by $R_{SO}$ 224. The reference frame 226 for the actual orbit 214 is denoted by O. The reference frame 228 for the ideal orbit is denoted by SO. The coordinate reference frame 114 tied to the spacecraft body 102 is denoted by $B_s$, and the coordinate reference frame 116 for the payload 108 is denoted $B_p$. In the equations that follow, the left superscript denotes the reference frame a vector is represented in.

The following vector equation results from FIG. 2:

$$R = (R_O - R_{sO}) + R_s \qquad (1)$$

which can then be written in the payload body frame 116 as $$^{B_p}R = C_{Bs}^{B_p} C_O^{Bs} [C_{SO}^{O}(^{SO}R_0 - {}^{SO}R_{s0}) + {}^{O}R_s] \qquad (2)$$

where the matrices $C_{SO}^{O}$, $C_O^{Bs}$, $C_{Bs}^{Bp}$ in the above equation are described as follows:

$C_{SO}^{O}$ is a directional cosine matrix that transforms the coordinate of a vector in the ideal orbit frame to that in the actual orbit frame. Orbit determination mechanization either onboard or on the ground can be used to determine this matrix.

$C_O^{Bs}$ is the directional cosine matrix that transforms the coordinate of a vector in the orbit frame to that in the steered spacecraft body frame. This matrix describes how the spacecraft body is steered with respect to the orbit frame.

$C_{Bs}^{Bp}$ is the directional cosine matrix that transforms the coordinate of a vector in the spacecraft body frame to that in the payload body frame. This matrix models the payload attitude errors due to, for example, thermal deformation and other reasons.

From the above relationships, the payload pointing correction can be achieved as follows.

Given the intended pointing direction (such as represented by the ideal orbit frame vector $^{SO}R_0$ 222), the spacecraft body 102, the payload 108, or both are steered so that the payload line of sight vector 112C is aligned with the vector $^{B_p}R$ computed using equation (3) below;

$$^{B_p}R = C_{Bs}^{B_p} C_O^{Bs} [C_{SO}^{O}(^{SO}R_0 - {}^{SO}R_{s0}) + {}^{O}R_s] \qquad (3)$$

where $C_O^{Bs}$ can be changed by spacecraft body 102 (bus) steering and $^{B_p}R$ can be changed by payload 108 steering.

Figure 3:
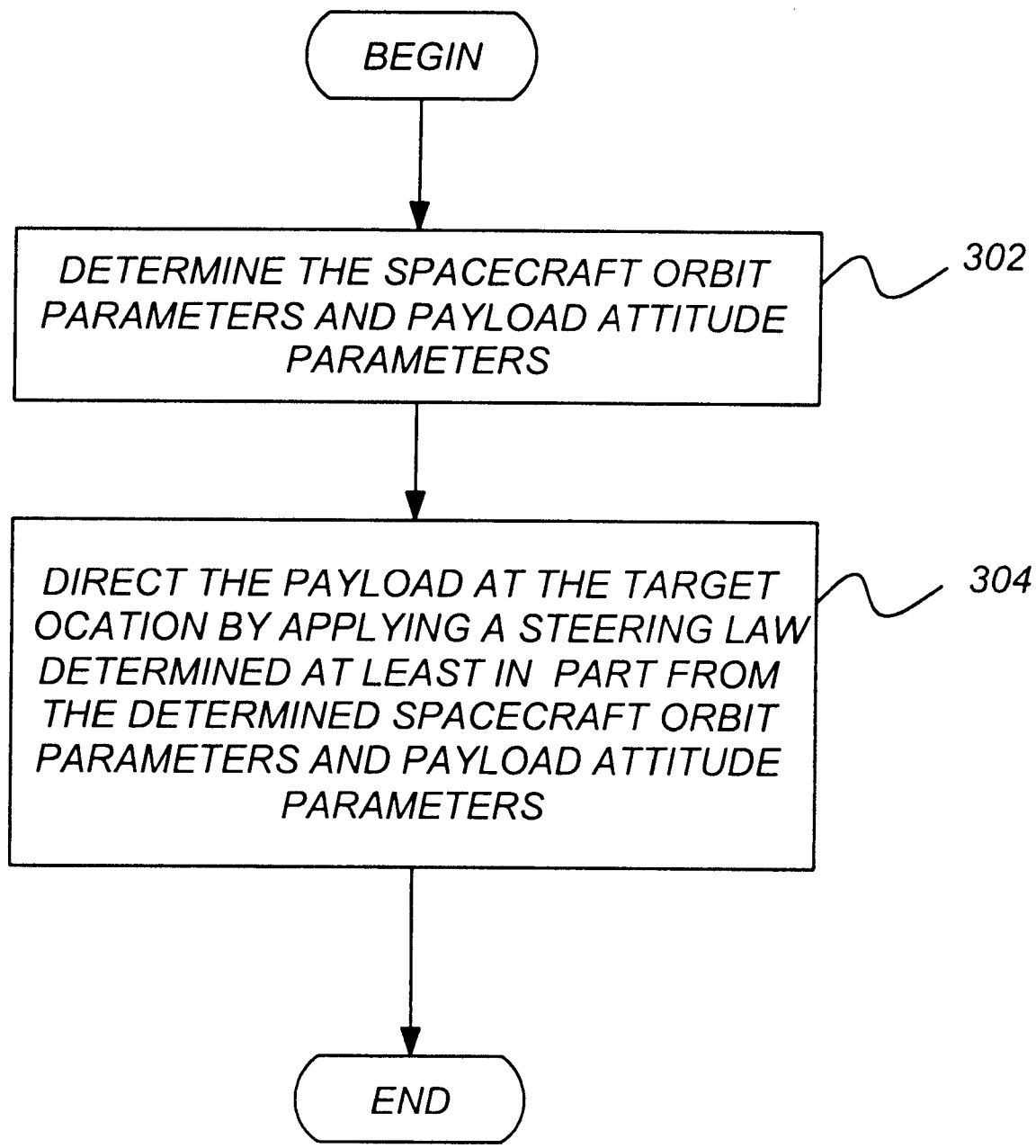
FIG. 3 is a flow chart illustrating exemplary process steps used to practice one embodiment of the present invention.

FIG. 3 is a flow chart illustrating exemplary process steps used to practice one embodiment of the present invention. Spacecraft 100 orbit parameters and bus and payload attitude parameters such as those discussed above are determined. This is illustrated in block 302. This determination may be made from spacecraft 100 based measurements, ground-based measurements, or a combination of both. Ground based measurements may be obtained from a private monitoring system, the Space Surveillance Network (SSN), or a space-based surveillance system. This determination may also be performed using spacecraft-based measurements such as those obtained from, for example, GPS receivers, a plurality of rate and acceleration sensors, star, earth, or sun trackers.

As depicted in block 304, the payload 108 is directed at the target location by applying a steering law determined at least in part from the determined spacecraft orbit parameters, bus attitude and payload attitude parameters.

In one embodiment, this is accomplished by using the measured or estimated spacecraft orbital parameters to determine a transformation between the measured spacecraft 100 orbital reference frame 230 and the ideal orbital reference frame 228 and a transformation between the measured payload reference frame and spacecraft bus body frame. In this case, the payload 108 is directed substantially at the target location 208 by applying a steering law derived at least in part from the transformation. The implementation of steering law by the spacecraft requires the spacecraft bus attitude information described above. Depending on registration requirements, this can be accomplished in a number of ways.

The foregoing operations can be performed serially, simultaneously or asynchronously.

Inverse Payload Attitude Error Steering

Figure 4:
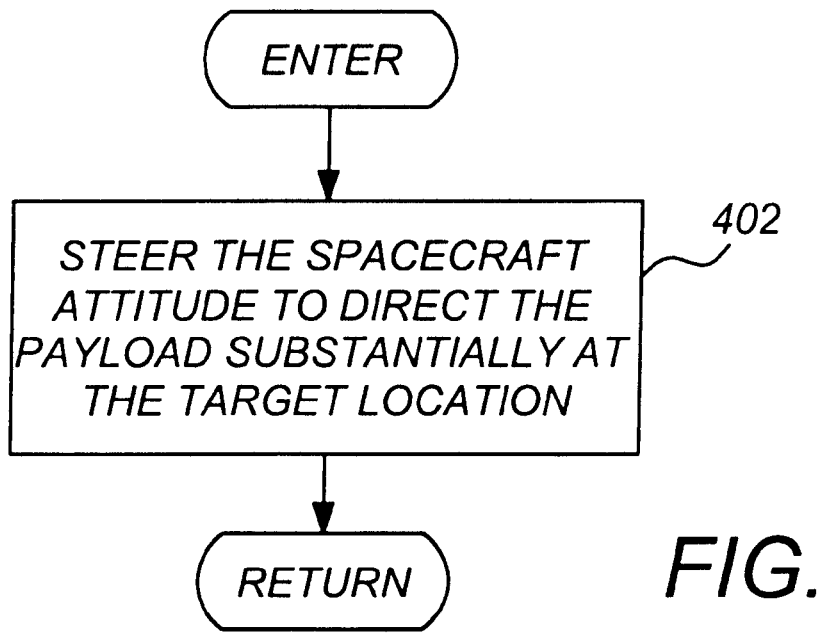
FIG. 4 is a flow chart presenting one embodiment of exemplary process steps to direct the payload substantially at the target location by applying the steering law determined from the orbital measurements.

FIG. 4 is a flow chart presenting one embodiment of exemplary process steps to direct the payload substantially at the target location by applying the steering law determined from the payload attitude parameters. In this embodiment, the selected steering law is one which steers the spacecraft bus (e.g. by changing its attitude) to compensate for payload attitude (orientation) errors. As shown in FIG. 4, in this embodiment, the step of directing the payload substantially at the target location by applying a steering law comprises the step of steering the spacecraft attitude to direct the payload at the target location, as shown in block 402.

This process can be mathematically described as choosing the steering directional cosine matrix $C_O^{Bs}$ to be the transpose (and the inverse, where the reference frame vectors are orthogonal) of the payload attitude error directional cosine matrix $C_{Bs}^{Bp}$. Hence, $$C_O^{Bs}=(C_{Bs}^{Bp})^T. \quad (4)$$

As a result, the corrected line of sight vector equation is simplified to the following:

$$^{Bi}R=C_{Bs}^{Bp}(C_{Bs}^{Bp})^T[C_{SO}^{O}(^{SO}R_0-^{SO}R_{s0})+^{O}R_{s0}]=C_{SO}^{O}(^{SO}R_0-^{SO}R_{s0})+^{O}R_{s0}. \quad (5)$$

Payload attitude error is thus compensated for by using the steering law defined in equation (4) and steering the spacecraft attitude to direct the payload 108 at the target location 208. The only error contributor left is the orbit error, which is taken into account by the $C_{SO}^{O}$ transform in equation (5).

Figure 5:
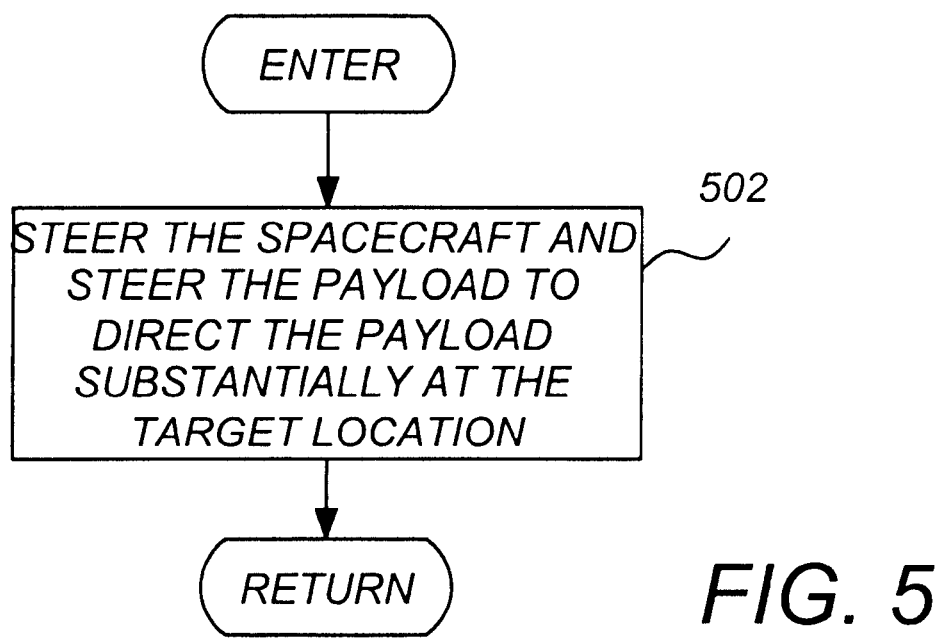
FIG. 5 is a flow chart presenting another embodiment of exemplary process steps to direct the payload substantially at the target location by applying the steering law determined form the orbital measurements.

FIG. 5 is a flow chart presenting another embodiment of exemplary process steps to direct the payload substantially at the target location by applying the steering law determined from the payload attitude parameters. In this embodiment, the selected steering law is one that steers the spacecraft and the payload to compensate for payload attitude errors. As shown in FIG. 5, in this embodiment, the step of directing the payload substantially at the target location by applying a steering law comprises the step of steering the spacecraft and the payload to direct the payload at the target location, as shown in block 502. In one embodiment, this can be accomplished by steering the satellite body 102 first, then the payload 108. Alternatively, the payload 108 can be steered first, then the satellite body 102. Or, the satellite body 102 and the payload can be steered at the same time.

Inverse Payload Attitude Error/Equatorial Normal Steering

In another embodiment, the spacecraft and the payload are both steered, but the spacecraft is steered in such a way that the payload attitude error and also the instantaneous "yaw-like" orbit error (i.e., the orbit inclination error that can be compensated by spacecraft body yaw-axis rotation) are compensated. The steering law for this embodiment can be mathematically described by factoring the orbit error directional cosine matrix $C_{SO}^{O}$ as $$C_{SO}^{O}=C_3(\theta_z)C_2(\theta_y)C_1(\theta_x) \quad (6)$$

wherein $C_3$ represents a matrix describing a rotation about a yaw axis, $C_2$ represents a matrix describing a rotation about a pitch axis, $C_1$ represents a matrix describing a rotation about a roll axis, $\theta_x$ represents an angular component of orbital errors induced by an inclined orbits about the spacecraft roll axis 106R ("roll-like orbit error"), $\theta_y$ represents an angular component of orbital errors induced by an inclined orbit about the spacecraft pitch axis 106P ("pitch-like orbit error"), and $\theta_z$ represents an angular component of orbital errors induced by an inclined orbit about the spacecraft yaw axis 106Y ("yaw-like orbit error").

Figure 6:
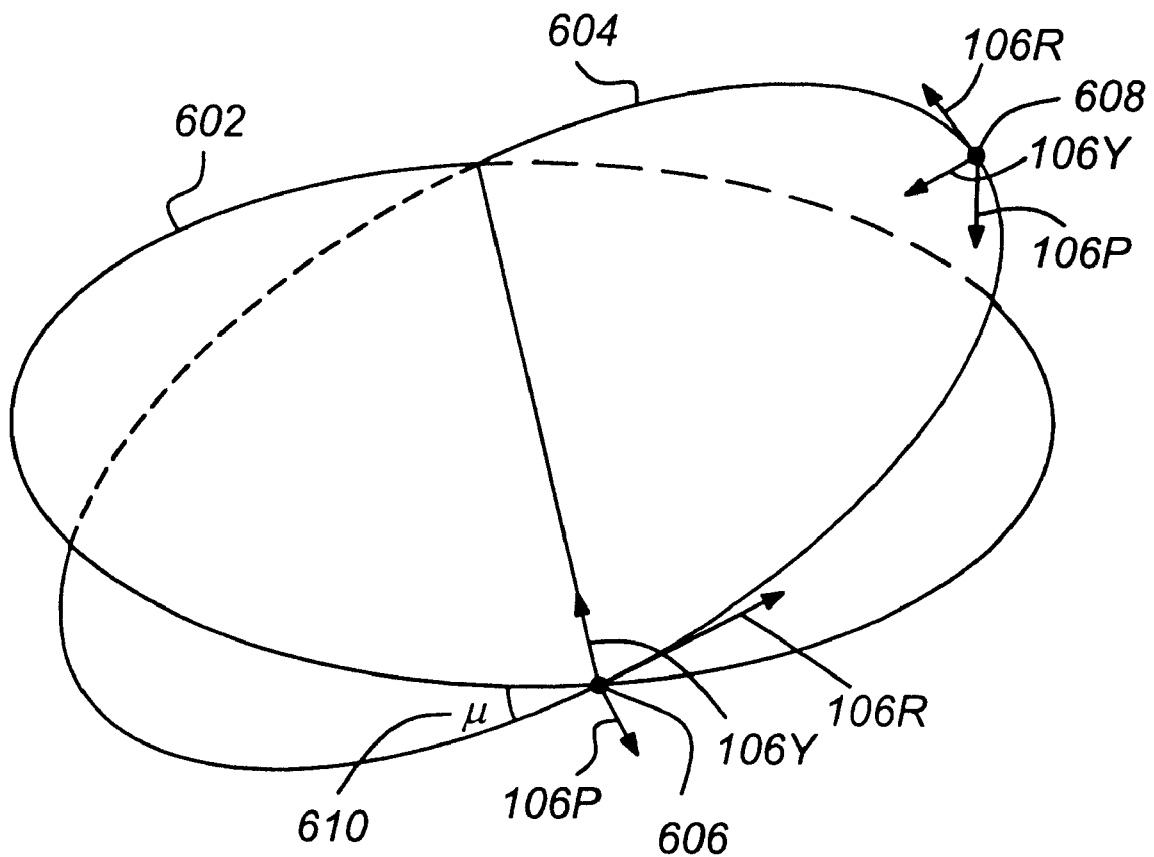
FIG. 6 is a diagram illustrating roll, pitch, and yaw-like orbit errors.

FIG. 6 is a diagram illustrating the roll, pitch, and yaw-like orbit errors. The orbit plane of the satellite 604 is inclined from the ideal orbit plane 602 by inclination angle $\mu$ 610. At first location 606, the orbital inclination error introduces an error (the yaw-like error discussed above) that can be accounted for by a rotation about the yaw axis 106Y. At second location 608, the orbital inclination error introduces an error (the roll-like error discussed above) that can be accounted for by a rotation about the roll axis 106R.

The steering law for this embodiment uses a the steering directional cosine matrix of the following form $$C_O^{Bs}=(C_{Bs}^{Bp})^T C_3(-\theta_z) \quad (7)$$

As a result, the corrected line of sight vector equation is as follows:

$$^{Bp}R=C_{Bs}^{Bp}C_O^{Bs}[C_{SO}^{O}(^{SO}R_0-^{SO}R_{s0})+^{O}R_{s0}]$$

$$=C_{Bs}^{Bp}(C_{Bs}^{Bp})^T C_3(-\theta_z)[C_3(\theta_z)C_2(\theta_y)C_1(\theta_x)(^{SO}R_0-^{SO}R_{s0})+^{O}R_{s0}]$$

$$=C_2(\theta_y)C_1(\theta_x)(^{SO}R_0-^{SO}R_{s0})+C_2(-\theta_z)^{O}R_{s0} \quad (8)$$

Since $C_3(-\theta_z)^{O}R_{s0}=^{O}R_{s0}$, the above equation can be further simplified to $$^{Bp}R=C_2(\theta_y)C_1(\theta_x)(^{SO}R_0-^{SO}R_{s0})+^{O}R_{s0}. \quad (9)$$

The foregoing allows "yaw like" orbit errors (including those from the effects of non-zero orbital inclination) to be compensated. Payload attitude error is likewise compensated for. Errors contributed by the orbit "pitch" and "roll" like errors alone remain. This steering law reduces the dynamic range of errors that must be corrected by the payload steering device, because a major source of the errors are compensated by steering the spacecraft body 102. Further, the steering correction is mathematically simple and easy to implement.

Figure 7:
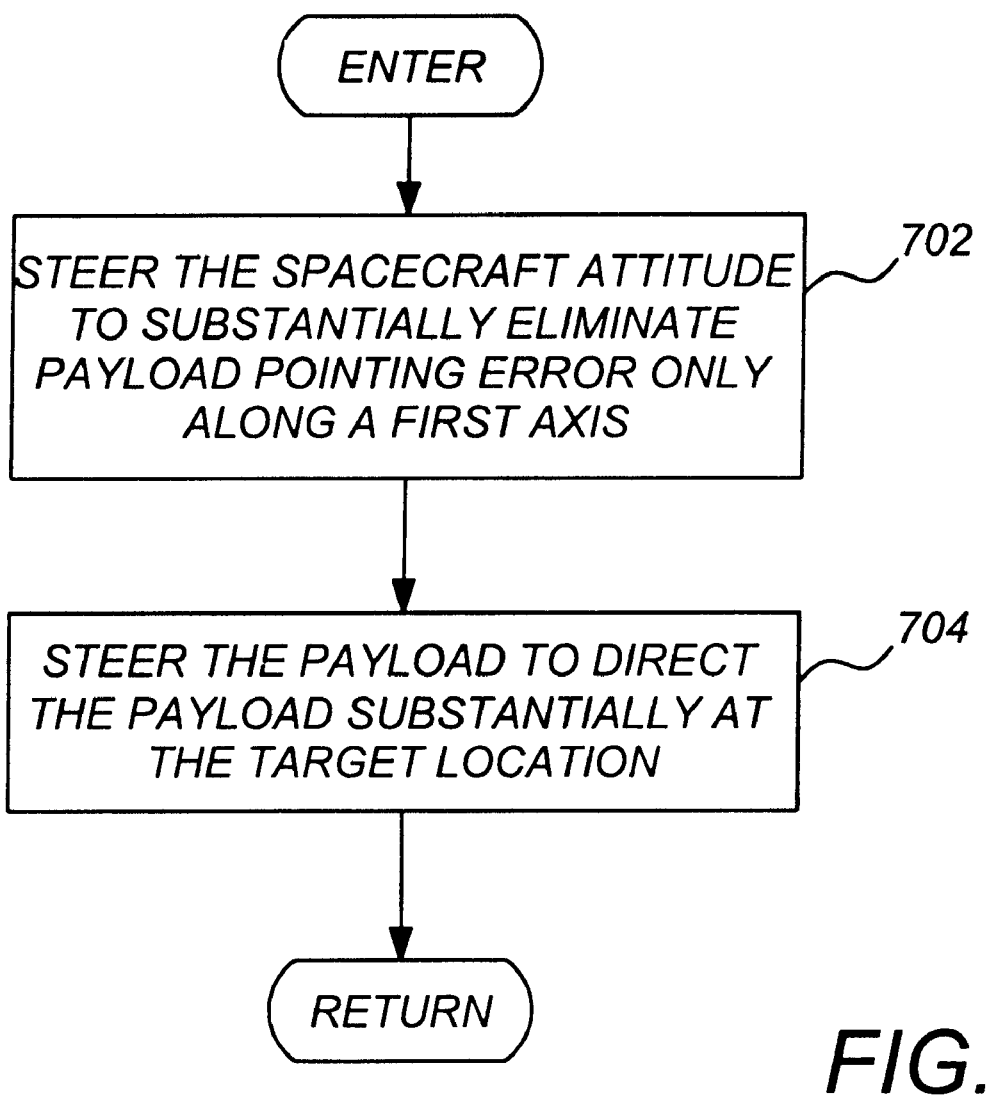
FIG. 7 is a flow chart presenting exemplary method steps for an embodiment of the present invention using equatorial normal steering.

FIG. 7 is a flow chart presenting exemplary method steps for the above-described embodiment. First, the spacecraft attitude is steered 702 to substantially eliminate payload pointing errors along a first axis. The payload 108 is then steered 704 to direct the payload 108 substantially at the target location 208. As described earlier above, these steps can occur simultaneously or in different order.

Minimum Correction Residue Steering

Figure 8:
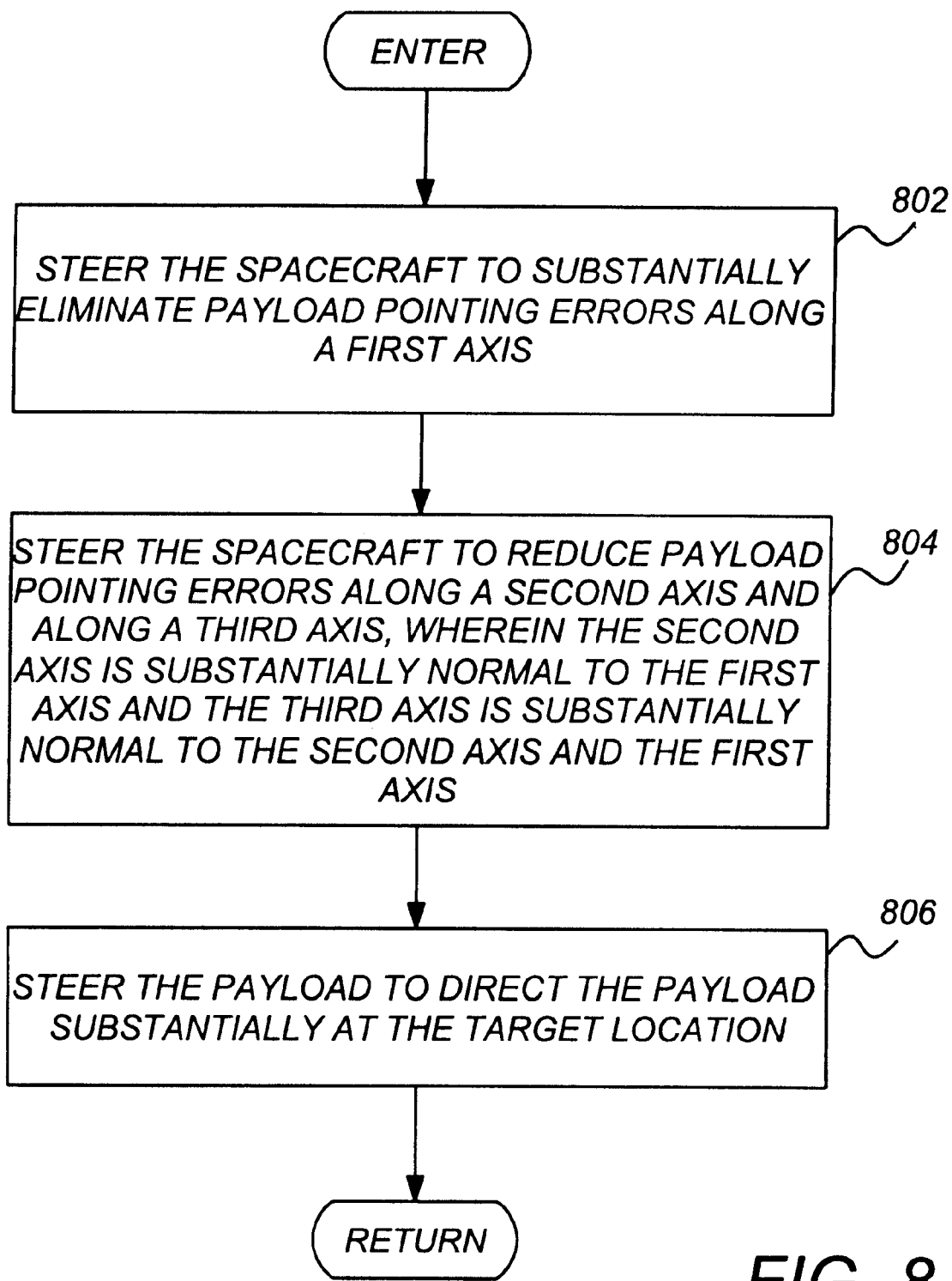
FIG. 8 is a flow chart presenting illustrative process steps used in practicing an embodiment in which the steering law is selected to steer the spacecraft such that the payload attitude error, the "yaw" like orbital error, and the median of the "pitch" and "roll" like orbital errors are compensated.

FIG. 8 is a flow chart presenting illustrative process steps used in practicing another embodiment of the present invention, in which the steering law is selected to steer the spacecraft 100 such that the payload 108 attitude error, the "yaw" like orbital error, and the median of the "pitch" and "roll" like orbital errors are compensated. As the result, the residual error remaining after the compensation is applied is minimized.

The spacecraft 100 is steered 802 to substantially eliminate payload pointing errors along a first (for example, yaw) axis. The spacecraft 100 is also steered 804 to reduce payload 108 pointing errors along a second (pitch, for example) axis and a third (roll, for example) axis. The payload 108 is also steered 806 to direct the payload 108 substantially at the target location 208. As before these steps can be performed in any order, or at the same time.

This steering law for this embodiment is derived as follows. Recalling that the orbit error directional cosine matrix be factorized as $$C_{SO}^{O}=C_3(\theta_z)C_2(\theta_y)C_1(\theta_x). \quad (6)$$

This steering law uses a steering directional cosine matrix of the following form:

$$C_O{}^{Bs}=(C_{Bs}{}^{Bp})^T C_1(\lambda_x,\theta_x)C_2(\lambda_y,\theta_y)C_3(-\theta_z). \quad (10)$$

Since $C_3(-\theta_z)^O R_{s0} = {}^O R_{s0}$ the corrected line of sight vector equation can be simplified to the following:

$$\begin{aligned}{}^{Bp}R &= C_{Bs}{}^{Bp}C_O{}^{Bs}[C_{SO}{}^O({}^{SO}R_0 - {}^{SO}R_{s0}) + {}^O R_{s0}]\\ &= C_1(\lambda_y,\theta_y)C_2(\lambda_x,\theta_x)C_2(\lambda_x,\theta_x)C_1(\lambda_y,\theta_y)\,({}^{SO}R_0 - {}^{SO}R_{s0}) +\\ &\quad C_1(\lambda_x,\theta_x)C_2(\lambda_y,\theta_y){}^O R_{s0} \end{aligned} \quad (11)$$

By proper choice of the parameters $\lambda_y$, $\lambda_x$ the dynamic range of the line of sight (LOS) correction for the range of the points to be pointed to for the specific application can be minimized.

One method of determining these two parameters is to examine a first order approximation of the above equation (which accounts for most of the dynamic range of the correction). For example, if the target location 208 is on the surface of the earth 202, and the east gimbal angle 120 and north gimbal angle 116 of the payload (E0 and N0, respectively), a first order approximation for the line of sight (LOS) gimbal angle correction can be obtained from the above equation. This first order approximation is described in equation (12) below, $$\delta E = (-\lambda_y + f(CC0))\theta_y \cos(N0)\ \delta N = (-\lambda_x + f(CC0))\theta_x + (-\lambda_y + f(CC0))\theta_y \tan(E0)\sin(N0) \quad (12)$$

where $CC0 = \cos(E0)\cos(N0)$, and $f(CC0)$ is a monotonic function of CC0, which characterizes the earth central angle.

From equation (12), the following relationship can be determined:

$$\lambda_x = \lambda_y = \frac{\max f(CC0) + \min f(CC0)}{2} \quad (13)$$

The use of the foregoing steering law reduces the dynamic range of the residue LOS pointing error of the payload 108.

If the application of this steering law reduces the residual error to a sufficiently low value, no further payload pointing compensation is required. If the residual error is still large, the residual error can be steered out using payload steering. Further, since the dynamic range of the residual error is smaller, the payload pointing system can be designed for faster response and/or smaller steady state errors.

Inverse Attitude/Orbit Steering

In another embodiment, the steering law is selected as:

$$C_O{}^{Bs} = (C_{Bs}{}^{Bp})^T (C_{SO}{}^O)^T. \quad (14)$$

Using this steering law, the corrected line of sight equation is simplified to $$^{Bp}R = C_{Bs}{}^{Bp}C_O{}^{Bs}[C_{SO}{}^O({}^{SO}R_0 - {}^{SO}R_{s0}) + {}^O R_{s0}] = ({}^{SO}R_0 - {}^{SO}R_{s0}) + C_O{}^{SO\,O}R_{s0}. \quad (15)$$

In this embodiment, the smart law results in a simplified payload steering implementation. However, this approach does not reduce, and may increase, the dynamic range of the payload steering error.

Minimum Correction Residue Steering and Tight Orbit Control Approach

If the steering law discussed with respect to FIG. 8 and equations (10)–(13) (the minimum correction residue steering law) is used, the remaining payload pointing errors are the payload light of sight (LOS) direction-dependent errors due to orbit errors. These errors can not be completely compensated by minimum correction residue steering law.

However, the minimum correction residue steering law can be augmented with tighter control over the spacecraft 100 orbit. In this case, the residue error is further reduced by controlling the orbit tightly through more frequent spacecraft 100 station-keeping maneuvers. Using this technique the payload pointing error can be made small enough that no further correction is required. In other words, no payload pointing correction steering is required.

Figure 9:
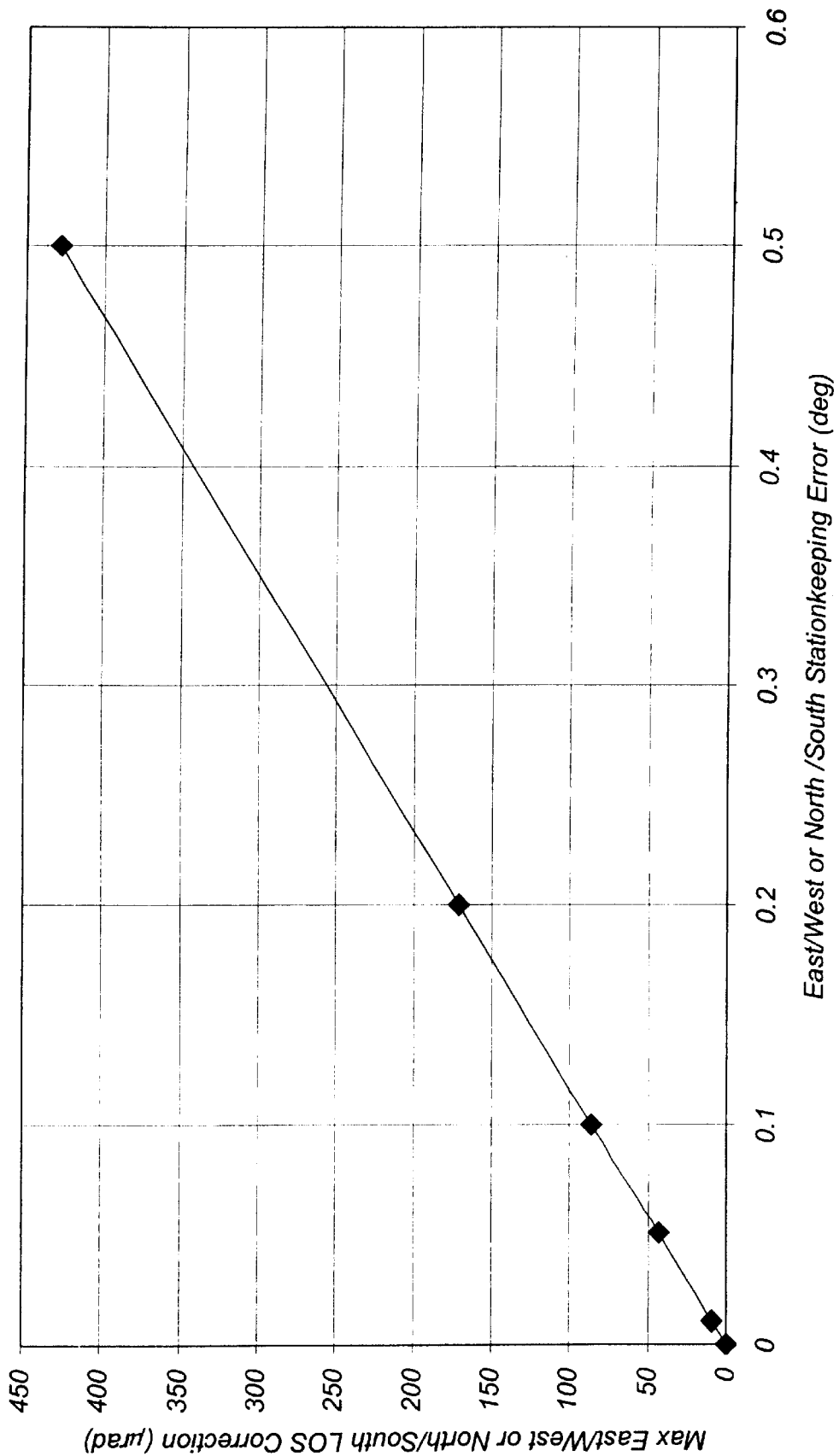
FIG. 9 is a diagram showing a relationship between stationkeeping error and the required LOS correction.

FIG. 9 is a diagram showing a relationship between stationkeeping error in degrees and the required LOS correction in microradians ($\mu$rad). In this case, a minimum correction residue steering law optimized for 60.5 degrees was used.

Current technology permits stationkeeping an accuracy of about 0.01 to 0.05 degrees. This means that if the minimum residue steering law is applied, the resulting residual error is approximately 9 to 43 microradians.

Figure 10:
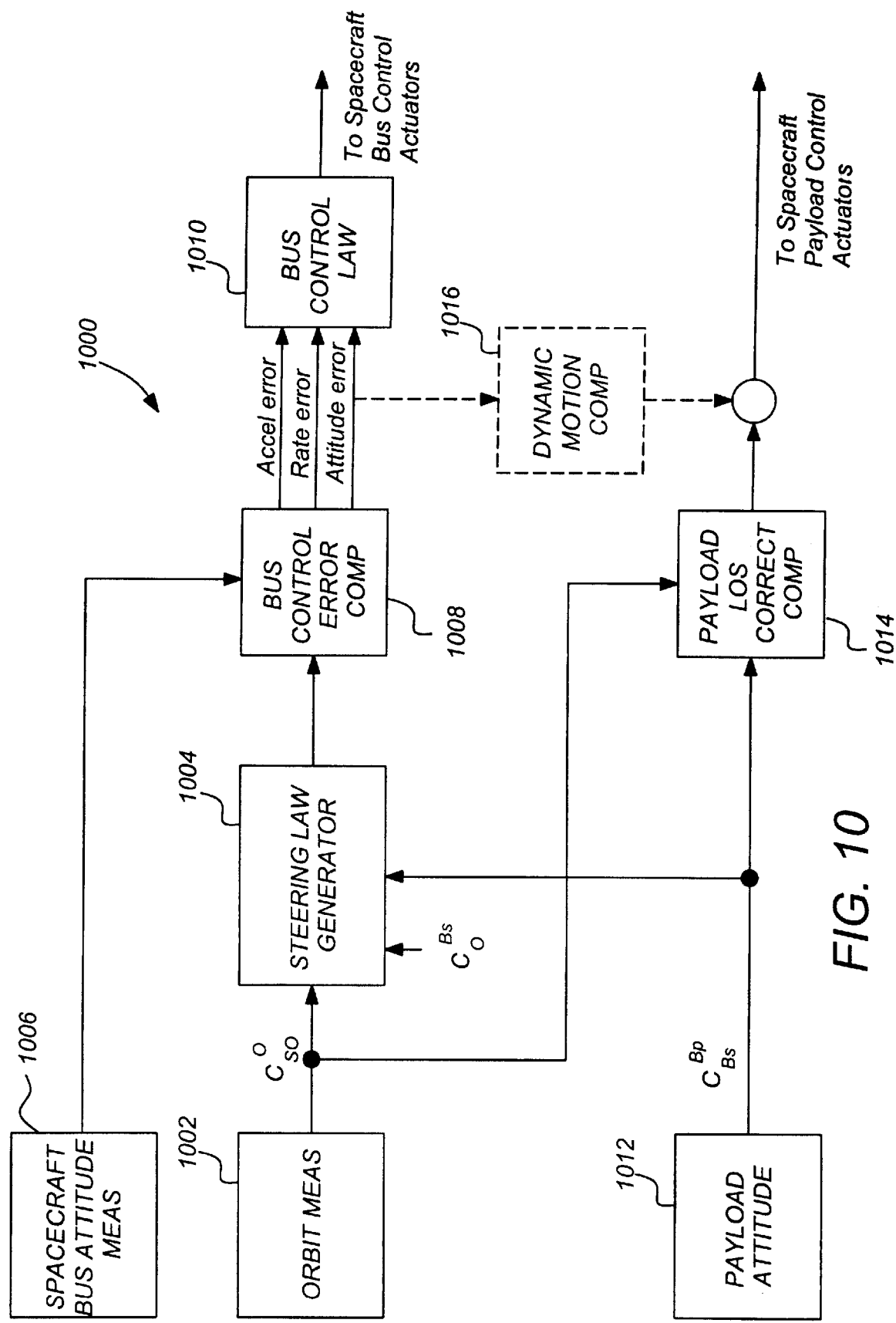
FIG. 10 is a functional block diagram of one embodiment of the payload steering control system.

FIG. 10 is a functional block diagram of one embodiment of a payload steering control system 1000. The control system 1000 comprises a navigation system 1002, which measures spacecraft 100 orbital parameters. These parameters are used to derive a directional cosine matrix (e.g. $C_{SO}{}^O$) that transforms the ideal orbit frame to the actual orbit frame and provides an estimate of the orbit error. The control system 1000 also includes a payload attitude measurement system 1012 that determines, whether through estimate, measurement of gimbal angles, or an error signal from the payload 108 itself, the attitude of the payload 108. This can be expressed by the directional cosine matrix $C_{Bs}{}^{Bp}$ that transforms the spacecraft body frame 114 to the payload body frame 116. The output of the navigation system 1002 and the payload attitude measurement system 1012 are supplied to the steering law generator 1004. Using these inputs and a directional cosine matrix describing a transformation from the orbital frame 230 to the spacecraft body frame 114, the steering law generator 1004 generates a command signal which is provided to a spacecraft body control error computation module 1008. The bus control error module 1008 generates, for example, an acceleration error (in each relevant channel, e.g. roll, pitch, and yaw), a rate error (in each relevant channel), and an attitude error (in each channel) using the output of the steering law generator 1004 and the measured spacecraft body 102 attitude, as measured by the spacecraft attitude measurement system 1006. These outputs are provided to the bus control law module 1010, which transforms these inputs into spacecraft bus control actuator commands.

The payload steering control system 1000 also includes paths for controlling the orientation of the payload 108. The payload LOS correction compensation module 1014 accepts inputs from the navigation system 1002 and the payload attitude measurement system 1012 to generate a command to the payload orientation system 110.

Optionally, payload steering control system 1000 may include a dynamic motion compensation module 1016, which provides a high bandwidth path of spacecraft body 102 attitude error to the payload orientation system 110. This allows spacecraft 100 attitude errors to be rapidly steered out by the payload orientation system by providing sufficient payload to spacecraft body isolation.

Figure 11:
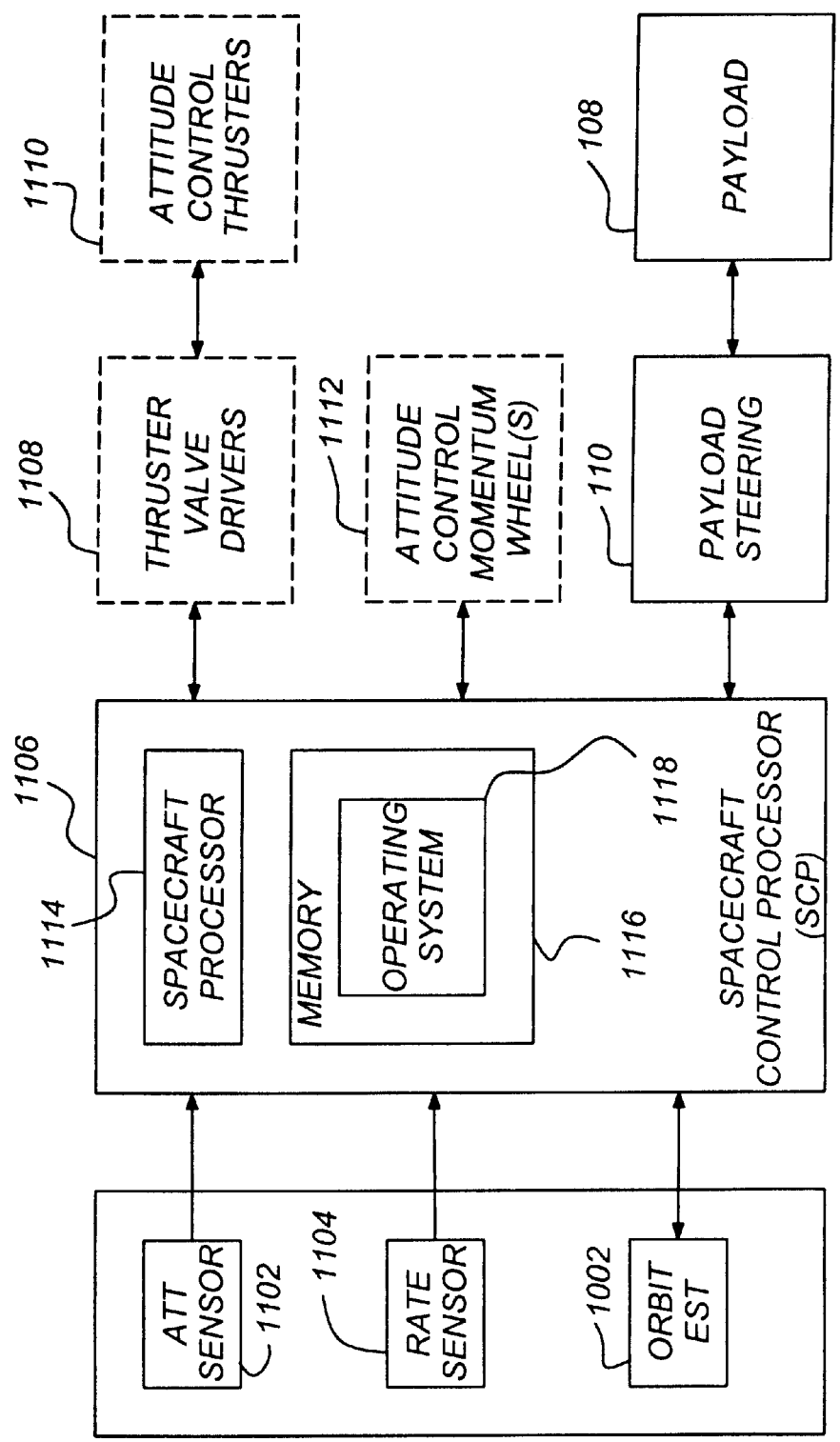
FIG. 11 is a schematic block diagram of one implementation of the payload steering control system.

FIG. 11 is a schematic block diagram of one implementation of the present invention. One or more attitude angle sensors 1102 provide an estimate of the satellite body 102 inertial attitude. The attitude sensors 1102 can include one or more sun sensors, one or more star sensors, one or more earth sensors, or any combination thereof. Further, the spacecraft body 102 inertial attitude information can be measured by an earth station and transmitted to the spacecraft 100. Rate sensors 1104 measure spacecraft inertial attitude rates, and can include mechanical gyros, ring laser gyros, or similar devices. Processed information from the attitude sensors 1102 can also be used to derive low bandwidth spacecraft attitude rate information. Orbital estimate module 1002 provides spacecraft orbit information.

Rate sensors 1104 and attitude angle sensors 1102 provide spacecraft 100 kinematic measurements to the spacecraft control processor (SCP) 1106. Orbital information such as ephemeris data is supplied to the SCP 1106 by the orbital estimate module 902. The spacecraft control processor 1106, thruster valve drivers 1108, and attitude control thrusters 1110, implement the spacecraft 100 steering functions described above. The SCP 1106 is also coupled to the payload orientation system 110, which steers the payload 108 as required. The SCP 1106 can be implemented as a single processor, with a plurality of modules for performing specific functions, or can include a plurality of processors. The present invention can be implemented with momentum wheels 1112.

The spacecraft control processor 1106 typically comprises a processor 1014 and a memory 1016, such as random access memory (RAM). Generally, the spacecraft processor 1114 operates under control of an operating system 1118 stored in the memory 1116, and interfaces with the other system components to accept inputs and generate outputs, including commands. Applications running in the spacecraft processor 1114 access and manipulate data stored in the memory 1116. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 1118, application programs, and other modules are tangibly embodied in a computer-readable medium, e.g., data storage device, which could include a RAM, PROM, EEPROM, or other memory device. Further, the operating system 1118 and the computer program are comprised of instructions which, when read and executed by the spacecraft processor 1114, causes the spacecraft processor 1114 to perform the steps necessary to implement and/or use the present invention. Computer program and/or operating instructions may also be tangibly embodied in memory 1116 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of the preferred embodiments of the present invention. In summary, the present invention describes a method, apparatus, and article of manufacture for directing a payload coupled to a spacecraft substantially at a target location.

The method comprises the steps of determining spacecraft orbit parameters, spacecraft bus attitude parameters and spacecraft payload attitude parameters, and directing the payload at the target location by applying a spacecraft bus steering law determined at least in part from the orbit and bus/payload attitude parameters. The apparatus comprises a navigation system for determining spacecraft orbit parameters and spacecraft attitude parameters, and for applying a spacecraft bus steering law to direct the payload substantially at the target location. The spacecraft bus steering law is determined at least in part from the determined spacecraft orbital parameters, the determined spacecraft attitude, and determined payload attitude parameters. In one embodiment, the apparatus includes a payload attitude control system for directing the payload relative to the spacecraft bus. The article of manufacture comprises a program storage device tangibly embodying a series of instructions for performing the above method steps.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of directing a payload coupled to a spacecraft bus substantially at a target location, comprising the steps of:

determining spacecraft orbit parameters, spacecraft bus attitude parameters and payload attitude parameters; and directing the payload at the target location by applying a spacecraft bus steering law determined at least in part from the determined spacecraft orbit parameters and payload attitude parameters.

2. The method of claim 1, wherein the step of directing the payload at the target location comprises the steps of:

steering the spacecraft bus to substantially reduce payload pointing errors about a first axis;

steering the spacecraft bus to reduce payload pointing errors about a second axis and about a third axis, wherein the second axis is substantially normal to the first axis and the third axis is substantially normal to the first axis and the second axis.

3. The method of claim 2, wherein the spacecraft bus is steered to reduce the median of the payload pointing errors about the second axis and the third axis.

4. The method of claim 3, further comprising the step of performing satellite stationkeeping maneuvers to reduce stationkeeping error.

5. The method of claim 1, wherein the determined orbit parameters define a spacecraft orbital reference frame and the spacecraft bus attitude parameters define a spacecraft bus reference frame, and the steering law is selected so that a spacecraft steering directional cosine matrix $C_O^{Bs}$ transforming the determined spacecraft orbital reference frame to a spacecraft bus reference frame is substantially equal to $(C_{Bs}{}^{Bp})^T C_1(\lambda_x \theta_x) C_2(\lambda_y \theta_y) C_3(-\theta_z)$, wherein:
- $C_3$ represents a matrix describing a rotation about the spacecraft first axis;
- $C_2$ represents a matrix describing a rotation about the spacecraft second axis;
- $C_1$ represents a matrix describing a rotation about the spacecraft third axis;
- $\theta_x$ represents an angular component of orbital errors induced by an inclined orbit about the spacecraft third axis;
- $\theta_y$ represents an angular component of orbital errors induced by an inclined orbit about the spacecraft second axis; and
- $\theta_z$ represents an angular component of orbital errors induced by an inclined orbit about the spacecraft first axis.

6. The method of claim 5, wherein the spacecraft bus is steered to reduce payload pointing errors along the second axis according to a parameter $\lambda_x$, and along the third axis according a parameter $\lambda_y$ according to a relation $$\lambda_x = \lambda_y = \frac{\max f(CC0) + \min f(CC0)}{2}, \text{ wherein:}$$

CC0=cos(E0) cos(N0) wherein E0 and N0 are substantially orthogonal gimbal angles of the payload; and max f(CC0) represents the maximum value of a monotonic function of CC0.

7. The method of claim 2, further comprising the step of steering the payload to direct the payload substantially at the target location.

8. The method of claim 6, wherein the steps of steering the spacecraft bus to substantially reduce payload pointing errors about the first axis, steering the spacecraft bus to reduce payload pointing errors about the second axis and about the third axis, and steering the payload to direct the payload substantially at the target location are performed substantially simultaneously.

9. The method of claim 1, wherein the step of directing the payload at the target location by applying a steering law determined at least in part from the determined spacecraft obit parameters and payload attitude parameters comprises the steps of:
- determining a transformation between a spacecraft orbital reference frame and an inertial reference frame using the determined spacecraft orbit parameters;
- determining a second transformation using the payload attitude parameters, the second transformation selected from the group comprising
  - a transformation between a spacecraft payload reference frame and a spacecraft orbit frame;
  - a transformation between a spacecraft payload reference frame and a spacecraft bus frame; and
- directing the payload at the target location by applying the steering law determined at least in part from the transformation and the second transformation.

10. The method of claim 1, wherein the determined spacecraft obit parameters are measured orbit parameters and the payload attitude parameters are measured payload attitude parameters.

11. The method of claim 1, wherein:
the step of directing the payload at the target location comprises the step of steering the spacecraft attitude to direct the payload at the target location.

12. The method of claim 3, wherein the steering law is selected so that a spacecraft steering directional cosine matrix $C_O{}^{Bs}$ transforming the measured spacecraft orbital reference frame to a spacecraft bus reference frame is substantially equal to a transpose of a payload directional cosine matrix transforming the spacecraft bus reference frame to a payload reference frame $C_{Bs}{}^{Bp}$.

13. The method of claim 1, wherein the step of directing the payload substantially at the target location comprises the step of steering the spacecraft bus and steering the payload to direct the payload at the target location.

14. The method of claim 13, wherein the spacecraft bus and the payload are steered substantially simultaneously to direct the payload substantially at the target location.

15. The method of claim 1, wherein the step of directing the payload at the target location comprises the steps of:
- steering the spacecraft bus to substantially reduce payload pointing errors substantially only along a first axis; and
- steering the payload to direct the payload substantially at the target location.

16. The method of claim 15, wherein the steering law is selected so that a spacecraft steering directional cosine matrix $C_O{}^{Bs}$ transforming a spacecraft orbital reference frame to a spacecraft body reference frame is substantially equal to $(C_{Bs}{}^{Bp})^T C_3(-\theta_z)$, wherein $C_{Bs}{}^{Bp}$ represents a payload directional cosine matrix transforming a spacecraft bus reference frame to a payload reference frame, $C_3$ represents a matrix describing a rotation about a spacecraft yaw axis, and $\theta_z$ represents an angular component of orbital errors induced by an inclined orbit about the spacecraft yaw axis.

17. The method of claim 15, wherein the steps of steering the spacecraft bus to eliminate payload pointing errors only about a first axis and steering the payload are performed substantially simultaneously.

18. An apparatus for directing a payload coupled to a spacecraft bus substantially at a target location, comprising:
- a navigation system for determining spacecraft obit parameters and spacecraft attitude parameters, and for applying a spacecraft bus steering law to direct the payload substantially at the target location; and
- wherein the spacecraft bus steering law is determined at least in part from the determined spacecraft orbit parameters, the determined spacecraft attitude, and determined payload attitude parameters.

19. The apparatus of claim 18, further comprising a payload attitude control system for directing the payload relative to the spacecraft bus.

20. The apparatus of claim 19, wherein the determined orbit parameters define a spacecraft orbital reference frame and the spacecraft attitude parameters define a spacecraft bus reference frame, and the steering law is selected so that a spacecraft steering directional cosine matrix $C_O{}^{Bs}$ transforming the determined spacecraft orbital reference frame to the spacecraft bus reference frame is substantially equal to a transpose of a payload directional cosine matrix transforming the spacecraft body reference frame to a payload reference frame $C_{Bs}{}^{Bp}$.

21. The apparatus of claim 19, wherein:
the navigation system steers the spacecraft bus and the payload attitude control system steers the payload to direct the payload at the target location.

22. The apparatus of claim 19, wherein:
the navigation system steers the spacecraft to substantially eliminate payload pointing errors only along a first axis; and
the payload attitude control system further comprises a payload orientation system for steering the payload to direct the payload substantially at the target location.

23. The apparatus of claim 22, wherein the determined orbit parameters define a spacecraft orbital reference frame and the spacecraft attitude parameters define a spacecraft bus reference frame, and the steering law is selected so that a spacecraft steering directional cosine matrix $C_O^{Bs}$ transforming the spacecraft orbital reference frame to the spacecraft bus reference frame is substantially equal to $(C_{Bs}^{Bp})^T C_3(-\theta_z)$, wherein $C_{Bs}^{Bp}$ represents a payload directional cosine matrix transforming the spacecraft bus reference frame to a payload reference frame, $C_3$ represents a matrix describing a rotation about a yaw axis, and $\theta_z$ represents an angular component of orbital errors induced by an inclined orbit about the spacecraft yaw axis.

24. The apparatus of claim 18, wherein:
   the navigation system steers the spacecraft bus to substantially reduce payload pointing errors about a spacecraft first axis and steers the spacecraft to reduce payload pointing errors about a spacecraft second axis and along a spacecraft third axis, wherein the second axis is substantially normal to the spacecraft first axis and the spacecraft third axis is substantially normal to the first axis and the second axis.

25. The apparatus of claim 18, wherein the navigation system performs satellite stationkeeping maneuvers to reduce orbital error.

26. The apparatus of claim 24, wherein the determined orbit parameters define a spacecraft orbital reference frame and the spacecraft attitude parameters define a spacecraft bus reference frame, and the steering law is selected so that a spacecraft steering directional cosine matrix $C_O^{Bs}$ transforming the determined spacecraft orbital reference frame to the spacecraft bus reference frame is substantially equal to $(C_{Bs}^{Bp})^T C_1(\lambda_x \theta_x) C_2(\lambda_y \theta_y) C_3(-\theta_z)$, wherein:
   $C_3$ represents a matrix describing a rotation about the spacecraft first axis;
   $C_2$ represents a matrix describing a rotation about the spacecraft second axis;
   $C_1$ represents a matrix describing a rotation about the spacecraft third axis;
   $\theta_x$ represents an angular component of orbital errors induced by an inclined orbit about the spacecraft third axis;
   $\theta_y$ represents an angular component of orbital errors induced by an inclined orbit about the spacecraft second axis; and
   $\theta_z$ represents an angular component of orbital errors induced by an inclined orbit about the spacecraft first axis.

27. The apparatus of claim 26, wherein the spacecraft bus is steered to reduce payload pointing errors along the second axis according to a parameter $\lambda_x$, and along the third axis according a parameter $\lambda_y$ according to a relation $$\lambda_x = \lambda_y = \frac{\max f(CC0) + \min f(CC0)}{2}, \text{ wherein:}$$

CC0=cos(E0) cos(N0) wherein E0 and N0 are substantially orthogonal gimbal angles of the payload; and
   max f(CC0) represents the maximum value of a monotonic function of CC0.

28. A program storage device, readable by a computer, tangibly embodying at least one program of instructions executable by the computer to perform method steps of directing a payload coupled to a spacecraft bus substantially at a target location, the method steps comprising the steps of:
   determining spacecraft orbit parameters, spacecraft bus attitude parameters and payload attitude parameters; and
   directing the payload at the target location by applying a spacecraft bus steering law determined at least in part from the determined spacecraft orbit parameters and payload attitude parameters.

29. The program storage device of claim 28, wherein the method step of directing the payload at the target location comprises the steps of:
   steering the spacecraft bus to substantially reduce payload pointing errors about a first axis;
   steering the spacecraft bus to reduce payload pointing errors about a second axis and about a third axis, wherein the second axis is substantially normal to the first axis and the third axis is substantially normal to the first axis and the second axis.

30. The program storage device of claim 29, wherein the spacecraft bus is steered to reduce the median of the payload pointing errors about the second axis and the third axis.

31. The program storage device of claim 30, further comprising the step of performing satellite stationkeeping maneuvers to reduce stationkeeping error.

32. The program storage device of claim 28, wherein the determined orbit parameters define a spacecraft orbital reference frame and the spacecraft bus attitude parameters define a spacecraft bus reference frame, and the steering law is selected so that a spacecraft steering directional cosine matrix $C_O^{Bs}$ transforming the determined spacecraft orbital reference frame to a spacecraft bus reference frame is substantially equal to $(C_{Bs}^{Bp})^T C_1(\lambda_x \theta_x) C_2(\lambda_y \theta_y) C_3(-\theta_z)$, wherein:
   $C_3$ represents a matrix describing a rotation about the spacecraft first axis;
   $C_2$ represents a matrix describing a rotation about the spacecraft second axis;
   $C_1$ represents a matrix describing a rotation about the spacecraft third axis;
   $\theta_x$ represents an angular component of orbital errors induced by an inclined orbit about the spacecraft third axis;
   $\theta_y$ represents an angular component of orbital errors induced by an inclined orbit about the spacecraft second axis; and
   $\theta_z$ represents an angular component of orbital errors induced by an inclined orbit about the spacecraft first axis.

33. The program storage device of claim 32, wherein the spacecraft bus is steered to reduce payload pointing errors along the second axis according to a parameter $\lambda_x$, and along the third axis according a parameter $\lambda_y$ according to a relation $$\lambda_x = \lambda_y = \frac{\max f(CC0) + \min f(CC0)}{2}, \text{ wherein:}$$

CC0=cos(E0) cos(N0) wherein E0 and N0 are substantially orthogonal gimbal angles of the payload; and
   max f(CC0) represents the maximum value of a monotonic function of CC0.

34. The program storage device of claim 29, further comprising the method step of steering the payload to direct the payload substantially at the target location.

35. The program storage device of claim 33, wherein the method steps of steering the spacecraft bus to substantially reduce payload pointing errors about the first axis, steering the spacecraft bus to reduce payload pointing errors about the second axis and about the third axis, and steering the payload to direct the payload substantially at the target location are performed substantially simultaneously.

36. The program storage device of claim 28, wherein the method step of directing the payload at the target location by applying a steering law determined at least in part from the determined spacecraft obit parameters and payload attitude parameters comprises the method steps of:

determining a transformation between a spacecraft orbital reference frame and an inertial reference frame using the determined spacecraft orbit parameters;

determining a second transformation using the payload attitude parameters, the second transformation selected from the group comprising
a transformation between a spacecraft payload reference frame and a spacecraft orbit frame;
a transformation between a spacecraft payload reference frame and a spacecraft bus frame; and directing the payload at the target location by applying the steering law determined at least in part from the transformation and the second transformation.

37. The program storage device of claim 28, wherein the determined spacecraft obit parameters are measured orbit parameters and the payload attitude parameters are measured payload attitude parameters.

38. The program storage device of claim 28, wherein:
the method step of directing the payload at the target location comprises the method step of steering the spacecraft attitude to direct the payload at the target location.

39. The program storage device of claim 30, wherein the steering law is selected so that a spacecraft steering directional cosine matrix $C_O^{Bs}$ transforming the measured spacecraft orbital reference frame to a spacecraft bus reference frame is substantially equal to a transpose of a payload directional cosine matrix transforming the spacecraft bus reference frame to a payload reference frame $C_{Bs}^{Bp}$.

40. The program storage device of claim 28, wherein the method step of directing the payload substantially at the target location comprises the method step of steering the spacecraft and steering the payload to direct the payload at the target location.

41. The program storage device of claim 40, wherein the spacecraft bus and the payload are steered substantially simultaneously to direct the payload substantially at the target location.

42. The program storage device of claim 28, wherein the method step of directing the payload at the target location comprises the method steps of:

steering the spacecraft bus to substantially reduce payload pointing errors substantially only along a first axis; and steering the payload to direct the payload substantially at the target location.

43. The program storage device of claim 42, wherein the steering law is selected so that a spacecraft steering directional cosine matrix $C_O^{Bs}$ transforming a spacecraft orbital reference frame to a spacecraft bus reference frame is substantially equal to $(C_{Bs}^{Bp})^T C_3(-\theta_z)$, wherein $C_{Bs}^{Bp}$ represents a payload directional cosine matrix transforming a spacecraft bus reference frame to a payload reference frame, $C_3$ represents a matrix describing a rotation about a spacecraft yaw axis, and $\theta_z$ represents an angular component of orbital errors induced by an inclined orbit about the spacecraft yaw axis.

44. The method of claim 42, wherein the steps of steering the spacecraft bus to eliminate payload pointing errors only about a first axis and steering the payload are performed substantially simultaneously.

* * * * *